United States Patent [19]
Harmuth et al.

[11] Patent Number: 5,573,987
[45] Date of Patent: Nov. 12, 1996

[54] REFRACTORY CERAMIC MASS AND ITS USE

[75] Inventors: Harald Harmuth, Villach; Roland Heindl; Josef Deutsch, both of Leoben, all of Austria

[73] Assignee: Veitsch-Radex Aktiengesellschaft fur feuerfeste Erzeugnisse, Vienna, Austria

[21] Appl. No.: 385,046

[22] Filed: Feb. 7, 1995

[30] Foreign Application Priority Data

Feb. 8, 1994 [DE] Germany ................ 44 03 868.2

[51] Int. Cl.$^6$ ................................ C04B 35/04
[52] U.S. Cl. .................. 501/108; 501/112; 501/117; 501/118; 501/120; 501/104; 501/123; 501/125; 501/94
[58] Field of Search .................... 501/104, 108, 501/118, 120, 123, 94, 112, 117, 125; 428/688

[56] References Cited

U.S. PATENT DOCUMENTS

| | | | |
|---|---|---|---|
| 2,571,101 | 10/1951 | Austin | 501/108 |
| 2,572,688 | 10/1951 | Austin | 501/108 |
| 2,579,781 | 12/1951 | Austin et al. | 501/108 |
| 4,729,974 | 3/1988 | Nazirizadeh et al. | 501/108 |
| 4,839,317 | 6/1989 | Uchida et al. | 501/108 |
| 5,021,374 | 6/1991 | Macey | 501/120 |

*Primary Examiner*—Mark L. Bell
*Assistant Examiner*—Michael Marcheschi
*Attorney, Agent, or Firm*—John F. A. Earley; John F. A. Earley, III

[57] ABSTRACT

The present invention pertains to a refractory ceramic mass, consisting of a pure magnesia component A and a component B, which consists of granules of pure magnesia, wherein the magnesia granules of component B have a ceating consisting of a refractory material whose granule size is fine compared with that of the magnesia granules and is chemically extensively inert with respect to the magnesia granule or reacts with the magnesia granule and/or itself consists of a plurality of components that are chemically reactive with one another.

9 Claims, 1 Drawing Sheet

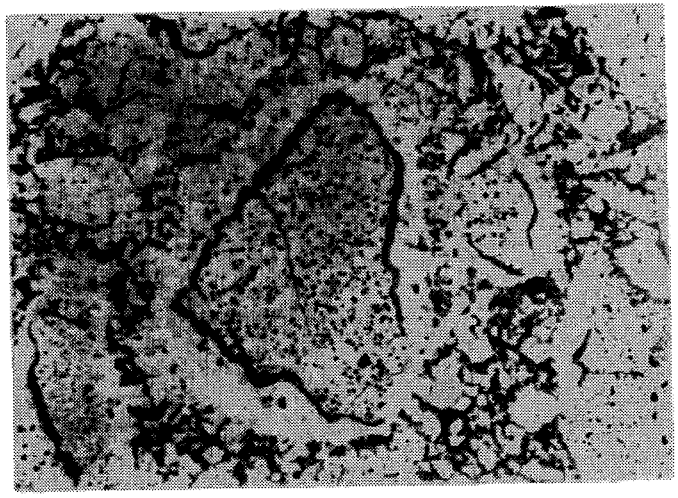

REFRACTORY CERAMIC MASS AND ITS USE

The present invention pertains to a refractory ceramic mass as well as to its use.

The present invention pertains especially to a basic refractory ceramic mass based on a sintered MgO (sintered magnesia). Sintered MgO is an essential component of all MgO and MgO spinel products. The sintered MgO is mineralogically called periclase. Magnesite, i.e., magnesium carbonate, or a synthetic source of magnesia is the essential raw material basis for preparing sintered MgO.

Refractory ceramic masses based on sintered MgO have been known in combination with various additives to control certain material properties, especially to improve the chemical resistance to slags, to improve the ductility as well as the thermal shock resistance. These additives include, e.g., chrome ore for preparing so-called magnesia chromite bricks. Their advantage is a reduced brittleness or higher ductility compared with pure magnesia bricks. In addition, there is improved corrosion resistance to non-basic slags.

Even though such products have proved, in principle, to be successful, optimizing refractory ceramic masses and moldings prepared therefrom has been a constant goal. For example, products with the lowest possible brittleness have been demanded for lining industrial furnaces, in which the refractory lining can be expected to be subject to appreciable mechanical stresses. These include, e.g., rotary kilns in the cement industry, where the refractory lining may be subject to considerable mechanical stresses due to deformation of the furnace, but also furnaces in the steel-making and nonferrous metal industry, where problems are caused especially by thermal stresses during heating and changes in temperature.

In addition, $Al_2O_3$-containing products were developed, which are prepared by adding alumina or magnesium aluminum spinel ($MgAl_2O_4$) to the brick mixture (MgO matrix). Some of these chromium oxide-free grades exhibit very good mechanical properties, but they frequently require high-quality and expensive raw materials.

Two typical batch compositions of a basic refractory mass for preparing bricks are presented below:

|  | A | B |
| --- | --- | --- |
| High-iron sintered magnesia | 92 wt. % | 88 wt. % |
| Sintered spinel (MA) |  | 12 wt. % |
| Sintered alumina | 8 wt. % |  |

Another way of improving the properties of the bricks according to the state of the art is to select special granule sizes. Such a mass may have, e.g., the following composition:

| Low-iron sintered magnesia | C |
| --- | --- |
| 2–4 mm | 55 wt. % |
| 125 μm to 2 mm | 10 wt. % |
| <125 μm | 35 wt. %. |

However, the mechanical properties can be influenced to a substantially lower extent only by controlling the granule size spectrum. In addition, the foreign oxide contents in sintered MgO reduce the effectiveness of the granule size manipulation, because they increase the degree of sintering.

The basic task of the present invention is to provide a refractory ceramic mass, which leads to good mechanical properties of the fired product after processing into fired moldings. The ductility shall be improved, in particular, in order to make it possible to advantageously use the products for applications that are associated with mechanical and/or thermal stresses.

The ductility (unit of measurement: m) is designated by R''''; it obeys the following law:

$$R'''' = \frac{G_f}{\sigma_f^2} \cdot E[m].$$

The following proportionality applies as well:

$$R'''' \sim \frac{G_f}{G_0},$$

in which $G_f$ is the energy of fracture (J/m²), $G_0$ is the energy of fracture for crack initiation (J/m²), $\sigma_f$ is the stress at break (N/m²), and E is the modulus of elasticity (N/m²).

To accomplish the task, the present invention is based on the idea of building up the mass from a plurality of components, wherein one component (A) consists of granules of pure magnesia, and at least one more component (B) is selected to be such that it satisfies at least one of the following properties:

(I) The additional component B shall differ from the pure magnesia component A in terms of its mechanical and/or thermal properties in order thus to generate stress centers and to initiate cracks in the finished, fired product under mechanical and/or thermal load, (II) Component B shall occur as a separate phase.

(III) Component B shall contact a sufficiently large portion of the pure magnesia component A, with which it can be engaged in mechanical interaction.

(IV) Component B is selected to be in a granule fraction which is sufficient for influencing the mechanical structural behavior.

(V) Component B shall not adversely affect the chemical composition of the entire mass or of the fired bricks prepared from it in terms of their high-temperature properties and wear properties.

In its most general embodiment, the present invention thus pertains to a refractory ceramic mass, comprising a pure magnesia component A and of a component B, which consists of granules of pure magnesia, wherein the magnesia granules of component B have a coating consisting of a refractory material whose granule size is smaller than that of the magnesia granules of component B and is inert with respect to the magnesia granules, or forms a spinel with the magnesia granules and/or it consists itself of a plurality of components that are reactive with one another, thus forming spinel.

Consequently, as a difference from the state of the art, component B is not selected from the viewpoint of a defined granular structure, but a magnesia granule fraction in which the individual granules are coated by a different refractory material is used as component B.

Examples of such a coating material include magnesia spinels, especially in the system (Mg, $Fe^{2+}$) (Cr, Al, $Fe^{3+}$)$_2O_4$. The pure representatives of this group of spinels are completely miscible with one another, so that practically all mixed crystals according to the general formula above can occur in nature or as a synthetic product. Specific examples are a magnesium aluminate spinel ($MgAl_2O_4$), picrochromite, chrome spinel or hercynite.

If such a (reacted) spinel is used as the material for the refractory coating of the magnesia component B, it no longer reacts with the enclosed magnesia granule, but under mechanical and/or thermal loads, it does have an independent behavior, which leads to the desired stress centers or to crack initiation, as a result of which the ductile properties of the fired refractory product can be markedly improved.

This also applies analogously to the alternative, in which the coating material consists of spinel-forming material, wherein the starting materials may again be of the type described above.

A chemical reaction with the magnesia granule of component B itself may also take place (alternative 3).

When a mass according to the present invention is prepared, it is necessary to first prepare component B in a separate processing step and then to mix it with component A. The coating material may be applied to the magnesia component B according to prior-art process technologies, e.g., by spraying, as is described in greater detail in another context in DE 38 42 403 C1. The coating material prepared in the form of fine particles may also be applied to the magnesia granule of component B by means of a dish granulator in the manner of pan coating. This is done, if necessary, while adding a binder, e.g., a lignosulfonate.

The intermediate product thus prepared (component B) is then mixed with component A in the known manner, subjected to further processing into moldings, and then fired in the usual manner.

This includes using component A at least partially in the form of magnesia flour, wherein the term "flour" is defined as a granule fraction of <125 μm.

Typical batch compositions according to the present invention are:

70 to 95 (80 to 88) wt. % of component A, 5 to 30 (12 to 20) wt. % of component B, wherein the ranges given in parentheses proved to be sufficient for solving the problem according to the present invention.

The pure magnesia component A (e.g., sintered MgO) may be used in a granule fraction of <8 mm, usually <4 mm, and, as was mentioned, part of it may be introduced in the form of a flour, and this percentage, relative to the total. mass, should be 17 to 35 wt. %, and it is 20 to 30 wt. % according to one embodiment.

However, it is also possible to add the total amount of component A in the form of a flour.

Two masses according to the present invention will be described in greater detail below, describing first component B, which is in the foreground according to the present invention. Component B consists here of sintered MgO of the granule fraction of <2 mm. In the case of mass D1, the individual magnesia granules are coated by an alumina powder, and in the case of D2, the coating of the magnesia granules consists of a zirconium oxide powder. Both were applied to the matrix granules according to the prior-art granulation technique, using a calcium lignosulfonate. The chemical composition of the intermediate product thus obtained (component B) is described below:

|  |  | D1 | D2 |
|---|---|---|---|
| $SiO_2$ | wt. % | 0.44 | 0.49 |
| $Fe_2O_3$ |  | 4.80 | 4.92 |
| $Al_2O_3$ |  | 20.20 | 0.12 |
| CaO |  | 1.60 | 1.60 |
| $ZrO_2$ |  | — | 18.15 |
| MgO |  | 72.20 | 74.05 |
| Balance: impurities. |  |  |  |

Component B is subsequently mixed with a component A consisting of pure sintered magnesia, which is divided into two fractions. The weight percents of the individual components are as follows:

|  | D1 | D2 |
|---|---|---|
| Component A: |  |  |
| Magnesia granules (high-iron) |  |  |
| granule size | 125 μm–4 mm | 125 μm–4 mm |
| percentage, wt. % | 57 | 60 |
| Magnesia flour (high-iron) |  |  |
| granule size | <125 μm | <125 μm |
| percentage, wt. % | 25 | 25 |
| Component B: |  |  |
| Coated magnesia granule percentage, wt. % | 18 | 15, | whose chemical analysis on the whole is as follows:

|  |  | D1 | D2 |
|---|---|---|---|
| $SiO_2$ | wt. % | 0.53 | 0.54 |
| $Fe_2O_3$ |  | 5.76 | 5.84 |
| $Al_2O_3$ |  | 3.8 | 0.15 |
| CaO |  | 1.88 | 1.90 |
| $ZrO_2$ |  | — | 2.73 |
| MgO |  | 87.80 | 88.20 |
| Balance: impurities. |  |  |  |

BRIEF DESCRIPTION OF THE DRAWING

The FIG. (1) shows a metallograph (polished section in incident light) of the fire brick prepared from the mass according to D1 at 50× magnification.

Clearly recognizable in the center of the metallograph is a sintered MgO granule (component B), which is surrounded by a spinel border formed from the alumina by reaction with the sintered magnesia and coats the coated magnesia granule, partially forming a cavity halo and is intimately intergrown with the brick matrix.

The table below shows the improvements that can be achieved in the ductility of the fired bricks by using the mass according to the present invention, wherein the measured R"" values are related to the maximum R"" value of all 5 samples and were determined at room temperature:

| Sample | A | B | C | D1 | D2 |
|---|---|---|---|---|---|
| $\frac{R''''}{R''''_{max}} \cdot 100\%$ | 58 | 64 | 23 | 100 | 95 |

This shows a sometimes drastic improvement in the "elastic" properties (toughness) of the bricks prepared from the refractory ceramic mass according to the present invention.

We claim:

1. Refractory ceramic mass comprising 70 to 95 wt. % of a pure magnesia component A and 5 to 30 wt. % of a component B, wherein component B comprises pure magnesia granules with a coating of a refractory material other than magnesia, said refractory coating material having a granule size that is finer than the pure magnesia granules of component B, said refractory coating material a) being inert with respect to the pure magnesia granules or, b) comprises components which form spinels with the magnesia granules, or c) comprises components which form spinels with one another, or d) comprises components which form spinels with one another and with the magnesia granules.

2. Mass in accordance with claim 1, in which the coating material is inert with respect to the pure magnesia granules and comprises a magnesia spinel.

3. Mass in accordance with claim 1, in which the refractory coating material comprises $ZrO_2$ or $Al_2O_3$.

4. Mass in accordance with claim 1, in which component A comprises pure magnesia flour and wherein a portion of said magnesia flour has a granule size of <125 μm.

5. Mass in accordance with claim 4, wherein 17 to 35 wt. % of said pure magnesia flour has a granule size of <125 μm.

6. Mass in accordance with claim 1, comprising:

80 to 88 wt. % of component A and 12 to 20 wt. % of component B.

7. Refractory ceramic mass comprising 80 to 88 wt. % of a pure magnesia component A and 12 to 20 wt. % of a component B, wherein component B comprises pure magnesia granules with a coating of a refractory material other than magnesia, said refractory coating material having a granule size that is finer than the pure magnesia granules of component B, said refractory coating material a) being inert with respect to the pure magnesia granules or, b) comprises components which form spinels with the magnesia granules, or c) comprises components which form spinels with one another, or d) comprises components which form spinels with one another and with the magnesia granules, wherein 17 to 35 wt. % of component A comprises pure magnesia flour having a granule size of <125 μm.

8. A mass in accordance with claim 7, in which the coating material is inert with respect to the pure magnesia granules and comprises magnesia spinel.

9. A mass in accordance with claim 7, in which the coating material comprises $ZrO_2$ or $Al_2O_3$.

* * * * *